May 25, 1926.
G. FLINTERMANN
THRUST BEARING
Filed July 16, 1925
1,586,443
3 Sheets-Sheet 1
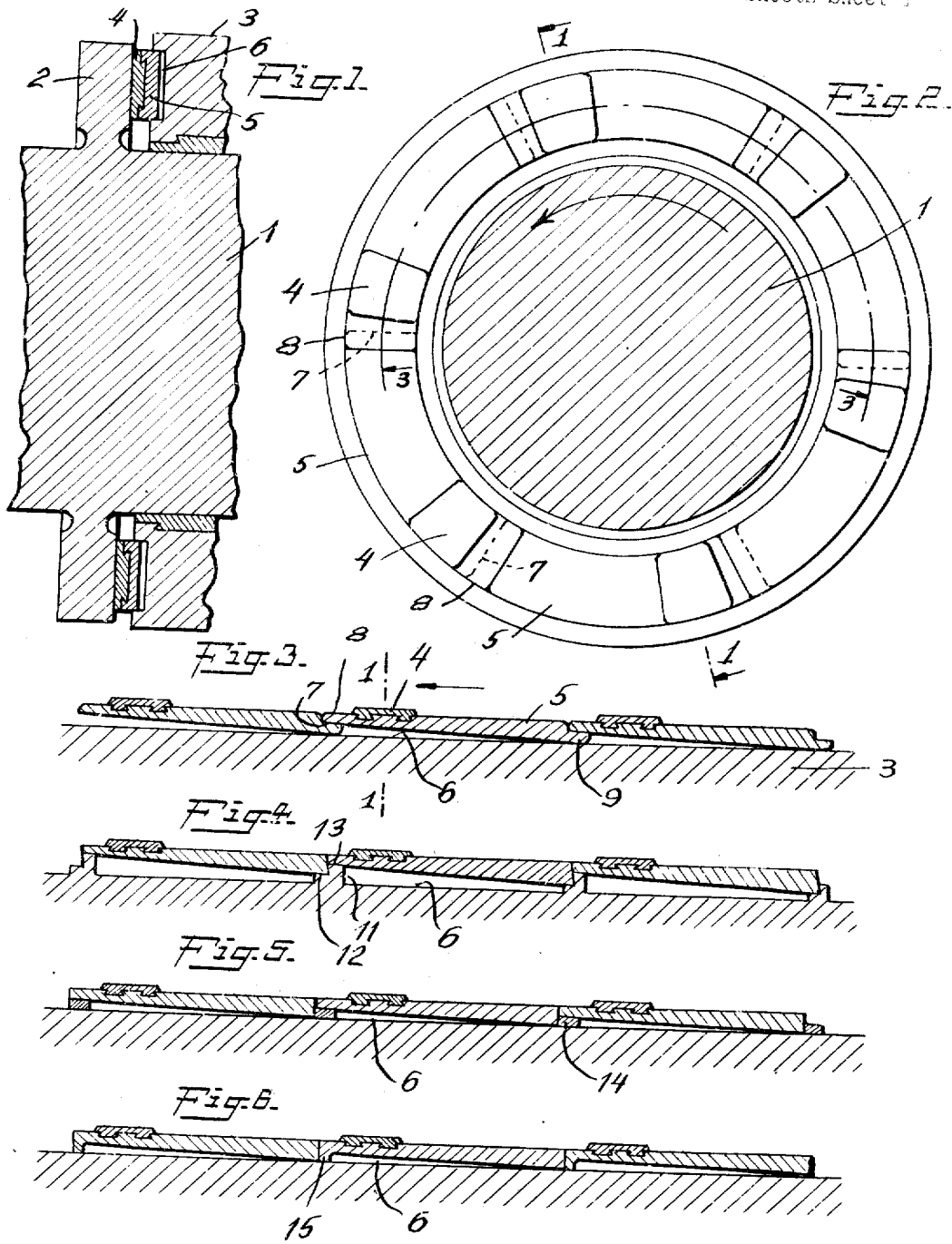
INVENTOR
Gerhard Flintermann
BY
ATTORNEYS May 25, 1926.

G. FLINTERMANN

THRUST BEARING

Filed July 16, 1925

INVENTOR
Gerhard Flintermann
BY
ATTORNEYS

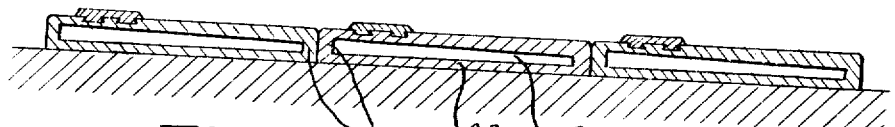
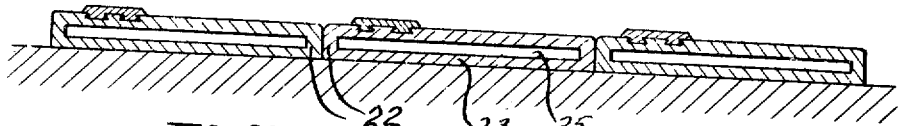
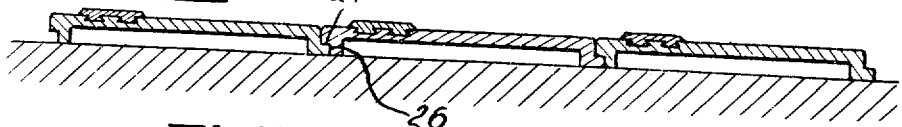
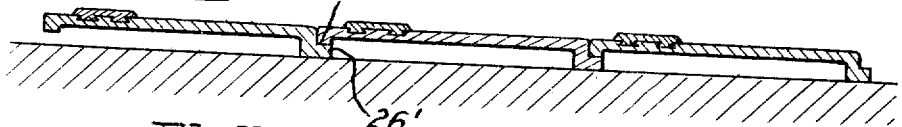
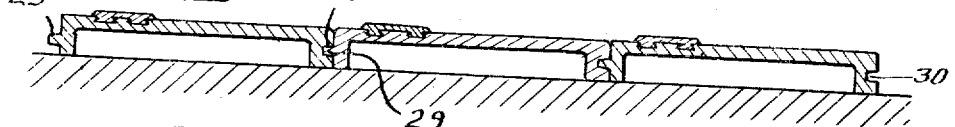
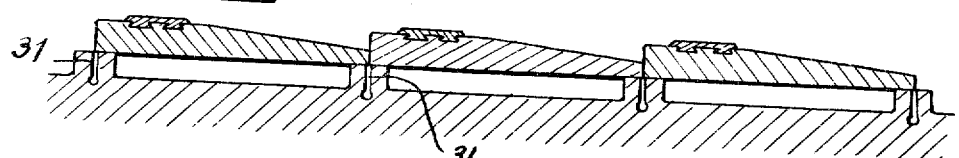
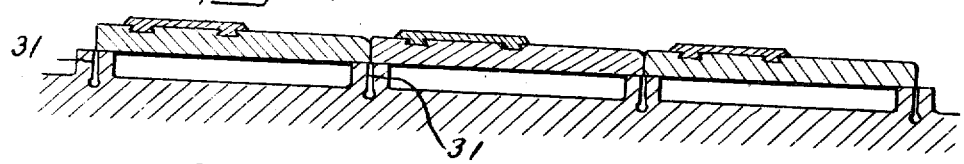
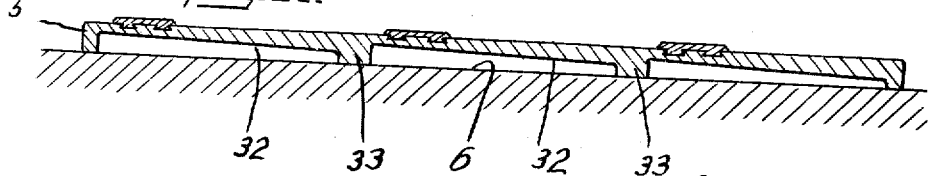

Patented May 25, 1926.

1,586,443

UNITED STATES PATENT OFFICE.

GERHARD FLINTERMANN, OF ORANGE, NEW JERSEY.

THRUST BEARING.

Application filed July 16, 1925. Serial No. 43,911.

This invention relates to thrust bearings of that type in which wedge shaped oil pockets are formed between relatively rotating members.

My copending application Serial No. 34.282 filed June 2, 1922, discloses a thrust bearing of this type in which the axial thrust causes deflection of separate and independent elastic plates associated with the bearing in such a way that wedge shaped spaces are formed between bearing pads carried by such plates and an adjacent surface of the rotating member. The present application relates to certain improvements in various parts of the thrust bearing disclosed in said copending application, particularly in respect to the construction of the plates on which the bearing pads are mounted.

One object of the invention is to so construct the plates as to obtain the most desirable and efficient oil wedge and thereby improve the lubrication.

Another object is to construct the plates in such a manner that the stresses and strains are uniformly distributed.

A further object of the invention is to so construct the thrust bearing that the area of the bearing pads and other friction surfaces may be reduced.

It is also an object of the invention to construct the plates in such a manner that the length of the plates may be reduced.

Another object is to construct the plates in such a manner that crystallization and fatigue of the metal is minimized.

Additional objects are to simplify the construction of the bearing, increase the efficiency of the bearing generally and to improve the automatic lubrication obtained in a bearing of this type.

The improvements are illustrated in the accompanying drawings in which

Fig. 1 is a partial longitudinal section through one form of the improved thrust bearing;

Fig. 2 is a side view of the thrust bearing shown in Fig. 1;

Figure 15:
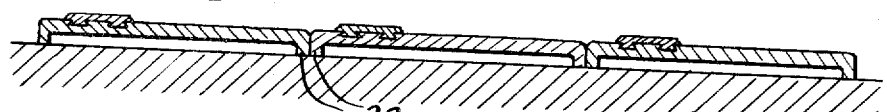
Figure 16:
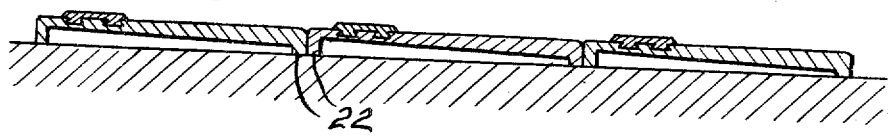

Figs. 3 to 10 inclusive are partial circumferential sections showing various ways in which the bearing plates may be constructed and supported;

Figs. 11 to 14 inclusive are longitudinal sections of modified forms of bearing plates;

Figs. 15 and 16 are partial circumferential sections showing further modified forms of bearing plates;

Figs. 17 and 18 are longitudinal sectional views of still further modified forms of bearing plates;

Figs. 19 to 21 inclusive are partial sections illustrating several ways in which adjacent bearing plates may be interlocked;

Figs. 22 and 23 are circumferential sections illustrating modifications of the supporting means for the bearing plates, and Fig. 24 is a circumferential section of another modified form of bearing plate.

In my copending application above referred to the separate and independent elastic plates which are deflected by an end thrust to produce the above mentioned wedge shaped oil pockets are substantially rectangular in longitudinal cross section. One of the improvements forming the subject matter of this application resides in shaping the bearing plates in such a way as to improve their deflection and produce the other advantages hereinafter recited. This is accomplished by making each plate of varying thickness preferably by tapering the plate from one end to the other.

Referring first to Figs. 1, 2 and 3, a rotary member such as a shaft is held against axial movement due to end thrust by means including an annular member 2 fixed on the rotary member 1 and from which such end thrust is transmitted through intermediate elements to a stationary member 3. Preferably the annular member 2 is substantially rectangular in cross section and is integral with the rotary member 1.

The end thrust, the direction of which is indicated by the arrow in Fig. 1, is transmitted to projecting parts or pads 4 mounted on stationary elastic or resilient plates 5 positioned in an annular groove 6 in the stationary member 3. In the modification illustrated in Figs. 1 to 3 inclusive the plates 5, instead of being substantially rectangular in longitudinal cross section as in my copending application, are preferably tapered from one end to the other as shown in Fig. 3. The thicker end of each plate may be provided with a seat 7 on which the thinner end 8 of the adjacent plate is supported, it being understood that the thicker end of each plate is supported on the bottom of the groove 6 as shown at 9. This provides simple means for spacing the major part of each plate from the bottom of the groove 6 to provide a clearance that will allow the plates to be deflected by the axial pressure.

The pads 4 may be of any suitable material such as Babbitt metal and there is one pad for each plate 5 located between the points at which the plate is supported and preferably placed near one end thereof, but far enough from the corresponding supporting point of the plate to cause the plate to be deflected when the axial pressure is exerted on the pads. The end of the plate on which the pad 4 is placed is determined by the direction of rotation of the member 1 indicated by the arrow in Fig. 2. The reason for this arrangement will be brought out later in the description.

The thrust or pressure transmitted from the rotary member 1 in the direction indicated by the arrow in Fig. 1, to the pads 4 on the elastic plates will cause the latter to be deformed or bent back into the clearance spaces in back of the same and the ends of the pads 4 farthest from the seats 7 will be moved slightly away from the adjacent surface of the annular member 2 thus automatically forming somewhat wedge shaped pockets between the adjacent surfaces of the pads 4 and the annular member 2. The extent to which this action takes place is dependent upon several factors such as the axial thrust, the distance between each pad 4 and the adjacent seat 7, the length of the plates and the thickness and elasticity of the plates.

The wedge shaped pockets formed between the adjacent surfaces of the annular member 2 and the pads 4 constitute part of the lubricating system. It should be understood that the pads 4 are near the ends of the plates 5 farthest along in the direction of rotation of the member 1 so that the latter will tend to move the lubricant into the wedge shaped pocket. The lubricating fluid, such as oil under pressure, keeps the rotary member 1 in equilibrium and at the same time lubricates the supporting and abutting active bearing surfaces. This effect is obtained by a relatively thin film of oil of high internal pressure, moved or rolled into the wedge shaped pocket and compressed therein, thus serving to keep the metallic surfaces apart to lubricate the same and to counteract the axial thrust. The compression of the oil in the wedge shaped pockets is very high and depends upon such factors as the shape of the wedge like pockets produced by the thrust, the speed of rotation of the rotary member 1, the quality of the lubricating fluid, and the pumping action.

By tapering the plates as indicated in Fig. 3, the bearing is made more efficient because the stresses and strains in the plates may be properly distributed. Moreover by tapering the plates they may be more readily deflected by the end thrust and, therefore, it is possible to reduce the length of the plates. When the plates are thus reduced in length a smaller number of plates is required and if desired they may be spaced apart circumferentially of the bearing in any suitable way. The reduction in the length of the plates also makes it possible to reduce the diameter of the bearing should this be desired. As the tapered plates may be more readily deflected than untapered plates for a given end thrust, the width and area of the friction surfaces may be reduced to obtain a certain deflection for a given thrust load. The reduction in size of the friction surface results in less friction losses making the bearing more efficient in operation. The reduction in radial width of the friction pads carried by the bearing plates, made possible by using tapered plates, is of particular advantage where the bearing is intended for use in connection with a thrust shaft of large diameter. By properly tapering the plates the most effective wedge shaped oil pocket may be obtained for a given load.

In Fig. 4 the end of one plate is not supported on the end of the adjacent plate as in Fig. 3, but the bottom of the groove 6 is provided with spaced projections 11 so shaped as to provide a seat 12 for the thicker end of one plate and a higher seat 13 for the thinner end of an adjacent plate. If desired, the seat 12 may be located above the bottom of the groove 6 so as to space the entire plate from the bottom of the groove. The edge surface of each plate at its thicker end may be inclined outwardly from top to bottom and the vertical wall between the seats 12 and 13 may be correspondingly inclined as shown in Fig. 4 in order to lock the plates in position.

In Fig. 5 separate supports 14 are provided in the groove 6 for supporting the thinner end of each plate. The thicker end of each plate may be supported directly in the bottom of the groove.

As shown in Fig. 6 the thinner end of each plate may be provided with an integral leg 15, for spacing the thinner end of the plate from the bottom of the groove 6.

Figure 7:
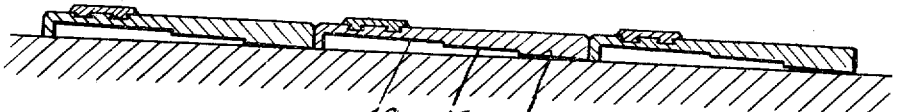

Instead of tapering the plates 5 for the purpose above described they may vary in thickness in other ways. For instance, as shown in Fig. 7 each plate may have portions of different thicknesses as indicated at 16, 17 and 18, the location of these portions and their relative thicknesses being so chosen as to result in the proper deflection of the plate by the axial thrust.

Figure 8:
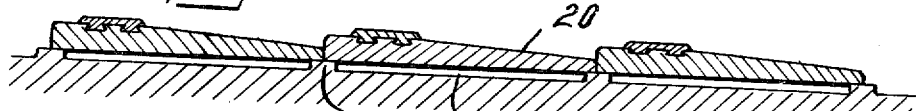
Figure 9:
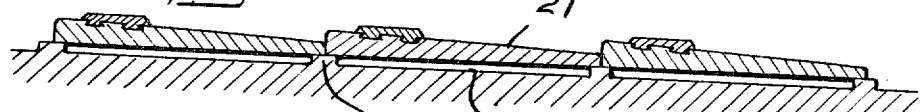

Instead of tapering or otherwise varying the thickness of the plates in the manner indicated in Figs. 3 to 7 inclusive, a portion or all of the upper surface of the plates may be inclined to produce the type of taper shown in Figs. 8 and 9. In the construction illustrated in these figures projections 19 of uniform height are provided in the bottom of the groove 6, and a portion of the upper surface of each plate is inclined, as shown at 20 in Fig. 8 or the entire upper surface of each plate is inclined as shown at 21 in Fig. 9. This construction has the additional advantage that a body of lubricant is retained in the pocket formed by the inclined surface and this acts as a reserve supply of lubricant to be delivered to the wedge shaped space and also serves to cool the remaining lubricant.

Figure 10:
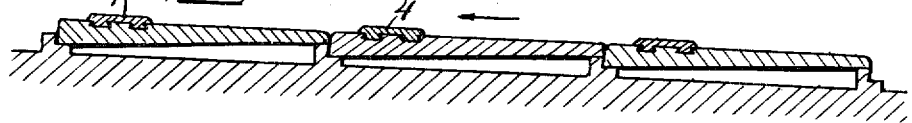
Figure 11:
Figure 12:

In any of the forms described above the pads 4 instead of being located at the thinner end of the plates may be located at the thicker ends as in Figs. 8 and 9 and as further illustrated in Fig. 10. In Fig. 10 the direction of rotation of the member 1 is assumed to be in the direction of the arrow, the same as in the other figures.

Figure 13:
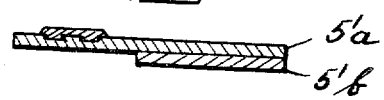
Figure 14:
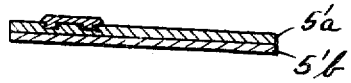

A plate of varying thickness may be produced in still other ways. For instance in Fig. 11 each plate is composed of two tapered plates 5' and 5" secured together in any suitable way. The lower plate 5" may be shorter than the upper plate 5' as in Fig. 11 or the two plates 5' and 5" may be of the same length as in Fig. 12. In Fig. 13 the plate is composed of two plates 5'$^a$ and 5'$^b$ each of which is rectangular in longitudinal cross section. The lower plate 5'$^b$ is shorter than the upper plate 5'$^a$ to cause the composite plate to have portions of different thickness. The lower plate 5'$^b$ may be the same length as the upper plate 5'$^a$ as in Fig. 14. In this case the composite plate would not have portions of different thickness but the plate would be more readily deflected than a plate not made in two parts.

Another improvement forming the subject matter of this application is the simplification of the construction of the bearing. This may be accomplished by constructing the plates in the manner shown in Figs. 15, 16, 17 and 18. In Figs. 15 and 16 the plates are provided with an integral leg 22 at each end to produce a bridge like construction. The legs space the body portion of the plate away from the bottom of the groove 5. The necessity of projections in the bottom of the groove or separate supports is thereby eliminated. This figure shows the body portion of each plate as rectangular in longitudinal cross section. In Fig. 16 the construction of the plates is the same as in Fig. 15 except that the body portion of each plate is tapered in order to produce the advantages set forth above. In Figs. 17 and 18 the legs 22 are connected by a bottom member 23 to form a box-like construction. This construction provides an interior hollow space 25 which permits the upper portion of the plate to be deflected by the axial thrust. In Fig. 17 the upper portion of the plate is tapered in longitudinal cross section to produce the advantages arising from the use of the tapering feature. In Fig. 18 the construction is the same as in Fig. 17 except that the upper portion of each plate is rectangular in longitudinal cross section.

If it be desired to interlock the plates this may be accomplished as illustrated in Figs. 19, 20 and 21. The plates represented in these figures are of the bridge like construction and according to Fig. 19 one leg of each plate may have a horizontal projection 26 which is held down by a recess 27 formed in the leg of the adjoining plate. In Fig. 20 the construction is somewhat the same as in Fig. 19 except that the horizontal projection 26' on each plate is of sufficient length to project entirely under the adjacent leg of the adjoining plate, this leg of the adjoining plate being in this case shortened as shown at 28 in order that it may rest over its entire thickness on top of the projection 26'. According to Fig. 21 a horizontal projection 29 may be formed on the end of one leg of each plate which may engage in a correspondingly shaped recess 30 in the adjacent leg of the adjoining plate.

In all those forms of the invention in which projections in the bottom of the groove 6 are utilized as seats for the plates, such projections may be provided with cuts or slits 31 (Figs. 22 and 23) so that that part of each projection which supports the end of one plate is in effect separate from that part of the same projection which supports the end of an adjacent plate. These cuts allow the metal to flex more easily thus assisting deflection of the plates. They also relieve certain strains and stresses in the metal brought about by load or which are inherent in the metal or which are brought about by the structural shape of the support. So far as this feature of the invention is concerned these cuts 31 may be utilized in the supporting projections for untapered plates of the type disclosed in my copending application as shown in Fig. 23. The depth of the cut will depend upon the amount of flexing that is desired in the support.

In all of the above described forms of the bearing plates in which the body of the plate is supported at one or both ends on integral legs, as, for instance, in Figs. 6, 7, 15, 16, 17 and 18, the even deflection of the plate is facilitated by rounding the corner at the junction between the leg and the plate. The amount of influence which this rounding of the corner has upon the deflection of the plate will depend upon the thickness of the metal at the bend, the length of the supporting leg, etc.

While the bearing plates have been described as being separate ones, most of the features described above apply also to a bearing plate which may be made in the shape of a complete ring or a ring divided into at least two sections. In the latter case the two sections of the ring would, of course, constitute separate plates. Fig. 24 illustrates the application of certain features of the invention to a ring section of this type. This ring section is in effect a uniting of several shorter plates of the type shown in some of the preceding figures. It is obvious that if all of the plates are united in this manner a complete ring section will be produced. Preferably, however, the ring would be formed in two halves, each half being constructed in the manner shown in Fig. 24. In fact this type of bearing member is one relatively long plate 5ª having grooves or recesses 32 formed in the lower surface thereof so as to provide supporting legs 33. These legs support the plate in the bottom of the groove 6 and provide clearance spaces to permit deflection of those portions of the plate which lie over the clearances. The recesses 32 are so shaped as to make the portion of the plate over the recesses of varying thickness. As shown in Fig. 24 these recesses are shaped so that the portions of the plate over the recesses taper as shown in the drawing.

Figs. 3 to 22 inclusive show the pads 4 as being relatively short but they may be made longer if desired as illustrated in Fig. 23.

It should be understood that any or all of the elastic plates may be fastened or secured in position by any suitable means such as screws, bolts or rivets.

I claim:—

1. A thrust bearing for rotary members, one part of which bearing comprises a series of separate elastic plates and a bearing pad near one end of each plate and in abutting relation with said rotary member, another part of said bearing comprising a support for the plates, the plates being mounted on the support so that axial thrust of said rotary member against said pads tends to deflect the plates, at least one of said parts of the bearing being constructed to facilitate deflection of the plates by the thrust load.

2. A thrust bearing for rotary members comprising a plurality of separate plates, each of said plates being supported at its ends and having a clearance beneath the plate between the points of support and each of said plates being tapered lengthwise of itself and circumferentially of the bearing throughout at least a portion of its length and each plate having a projecting friction pad between its ends adapted to abut the rotary member.

3. A thrust bearing comprising a plurality of separate elastic plates each of which is tapered throughout at least a portion of its length, a member having a surface over which said plates lie, at least one end of each plate being spaced away from said surface to permit the plates to be deflected by the thrust load, and a bearing pad associated with each bearing plate near one end thereof.

4. A thrust bearing comprising a rotary member, a stationary member having a circumferential groove therein, a plurality of separate elastic plates positioned in said groove, each of said plates being tapered throughout at least a portion of its length and each plate having at least one end spaced away from the bottom of said groove and each plate having a friction surface near one end thereof adapted to abut against the surface of said rotary member whereby the axial thrust of said rotary member deflects said plates.

5. A thrust bearing comprising a rotary member, a stationary member having a circumferential groove therein, a plurality of separate elastic plates positioned in said groove, each of said plates having a main body portion which is tapered throughout a portion of its length, and means for spacing at least one end of each plate away from the bottom of said groove, each plate having a friction surface near one end adapted to abut against the surface of said rotary member whereby the axial thrust of said member deflects said plates.

6. A thrust bearing comprising a series of separate elastic plates, and a supporting surface for said plates, each of said plates having an integral supporting leg at at least one end of the plate to space at least one end of the plate away from said surface to thereby permit deflection of the plate by the thrust load and a bearing or friction pad near one end of each plate on which the thrust load acts to deflect the plate.

7. A thrust bearing in accordance with claim 6 having an integral supporting leg at each end of each plate for spacing the entire plate away from said surface.

8. A thrust bearing comprising a rotating member, a plurality of separate elastic plates, means for supporting one end of each plate and the adjacent end of an adjoining plate, a friction surface near one end of each plate but between the supported ends and in abutting relation with said rotating member, said supporting means being bisected so that each half will flex when the plate supported by that half is deflected by the thrust load.

9. A thrust bearing comprising an arcuate bearing plate, a supporting surface, means to space the plate away from said surface at a plurality of points, the plate between said points being of varying thickness lengthwise of the plate and circumferentially of the bearing, and a bearing pad on said plate between each two of said points for causing deflection of the plate between said points.

10. A thrust bearing for rotary members having among its elements a plurality of elastic plates, each plate being of varying section to produce a thick end and a thin end and each of said plates having its thin end overlapping the next following plate at its thick end, said plates being disposed in a circumferential series, each of the plates being supported to provide a clearance under the plate between the points of support, and a projecting friction pad on the top side of each of said plates located so as to be clear of the overlapping ends, said clearance allowing deflection of the plates as the rotary member causes pressure against the projecting friction pads.

11. In a thrust bearing for rotary members, a plurality of separate elastic plates, a support for the plates provided with a grove in which the plates are located, each of said plates being tapered endwise of itself and circumferentially of the bearing and having radial sections of uniform thickness and each of the plates being supported at its ends to provide a clearance under the plate at its intermediate portion to allow deflection of the plate, and a projecting friction pad on the top side of each plate to abut said rotary member.

12. In a thrust bearing for rotary members a plurality of bearing plates each of which is supported at at least two points to provide a clearance under the plate between the points of support, the plate sections between said points of support being of varying thickness lengthwise of the plate and circumferentially of the bearing to effect an even deflection of said sections, and a projecting friction pad on each plate between the points of support, said pads being relatively small to permit deflection of the plate sections between the points of support.

In testimony whereof I affix my signature.

GERHARD FLINTERMANN.

elastic plates, each plate being of varying section to produce a thick end and a thin end and each of said plates having its thin end overlapping the next following plate at its thick end, said plates being disposed in a circumferential series, each of the plates being supported to provide a clearance under the plate between the points of support, and a projecting friction pad on the top side of each of said plates located so as to be clear of the overlapping ends, said clearance allowing deflection of the plates as the rotary member causes pressure against the projecting friction pads.

11. In a thrust bearing for rotary members, a plurality of separate elastic plates, a support for the plates provided with a grove in which the plates are located, each of said plates being tapered endwise of itself and circumferentially of the bearing and having radial sections of uniform thickness and each of the plates being supported at its ends to provide a clearance under the plate at its intermediate portion to allow deflection of the plate, and a projecting friction pad on the top side of each plate to abut said rotary member.

12. In a thrust bearing for rotary members a plurality of bearing plates each of which is supported at at least two points to provide a clearance under the plate between the points of support, the plate sections between said points of support being of varying thickness lengthwise of the plate and circumferentially of the bearing to effect an even deflection of said sections, and a projecting friction pad on each plate between the points of support, said pads being relatively small to permit deflection of the plate sections between the points of support.

In testimony whereof I affix my signature.

GERHARD FLINTERMANN.

CERTIFICATE OF CORRECTION.

Patent No. 1,586,443.   Granted May 25, 1926, to

GERHARD FLINTERMANN.

It is hereby certified that error appears in the printed specification of the above numbered patent requiring correction as follows: Page 1, line 6, for "June 2, 1922", read "June 2, 1925"; page 5, line 18, claim 11, for the misspelled word "grove" read "groove"; and that the said Letters Patent should be read with these corrections therein that the same may conform to the record of the case in the Patent Office.

Signed and sealed this 8th day of November, A. D. 1927.

M. J. Moore,
Acting Commissioner of Patents.

Seal.

CERTIFICATE OF CORRECTION.

Patent No. 1,586,443. Granted May 25, 1926, to

GERHARD FLINTERMANN.

It is hereby certified that error appears in the printed specification of the above numbered patent requiring correction as follows: Page 1, line 6, for "June 2, 1922", read "June 2, 1925"; page 5, line 18, claim 11, for the misspelled word "grove" read "groove"; and that the said Letters Patent should be read with these corrections therein that the same may conform to the record of the case in the Patent Office.

Signed and sealed this 8th day of November, A. D. 1927.

Seal.

M. J. Moore,
Acting Commissioner of Patents.